Oct. 10, 1950   H. SCHOEPE   2,525,428
MACHINE TOOL TRANSMISSION AND CONTROL
Filed July 17, 1947   6 Sheets-Sheet 1
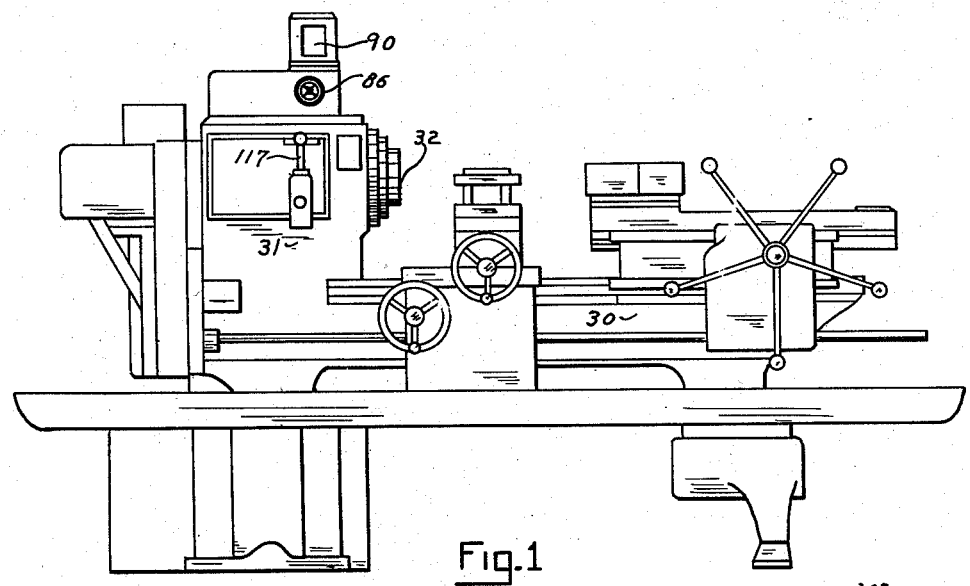
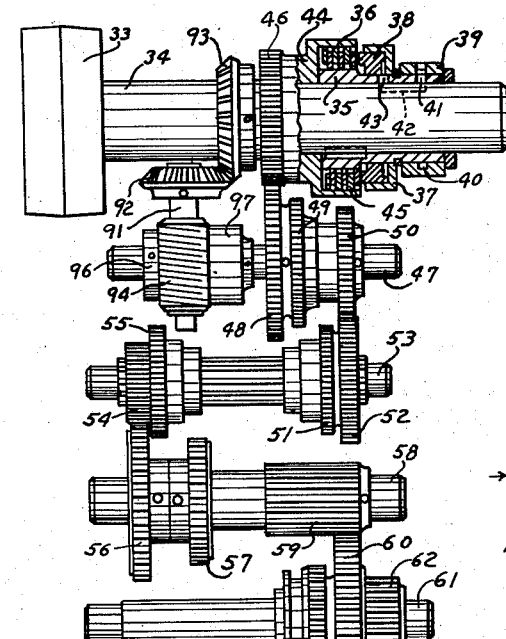
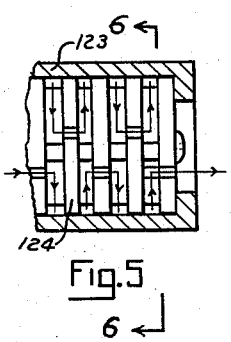
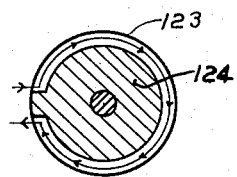
INVENTOR.
HARRY SCHOEPE
BY Kwis, Hudson, Boughton & Williams
ATTORNEYS
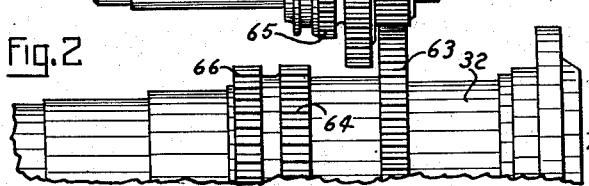

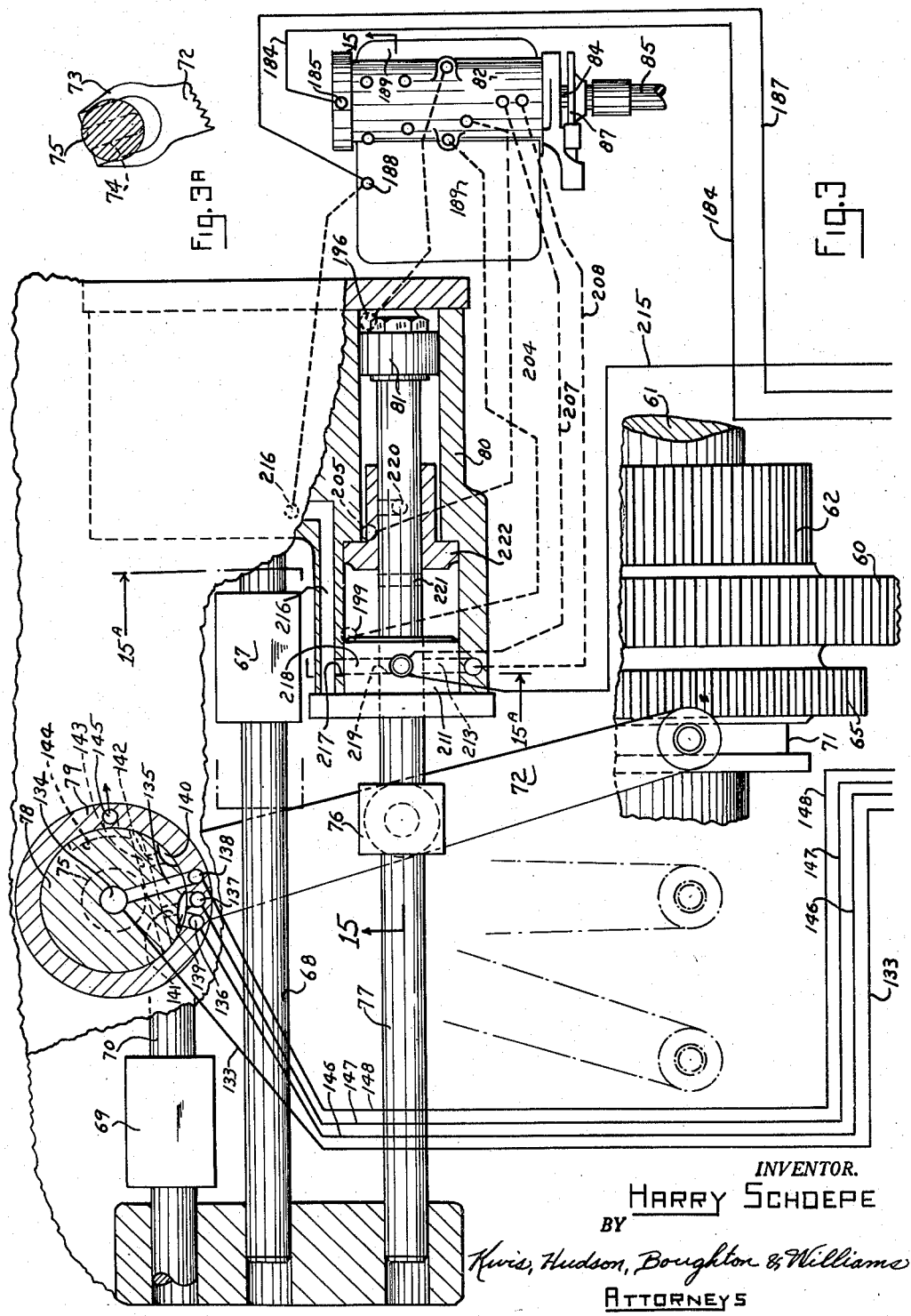

Oct. 10, 1950           H. SCHOEPE           2,525,428
MACHINE TOOL TRANSMISSION AND CONTROL
Filed July 17, 1947           6 Sheets-Sheet 3
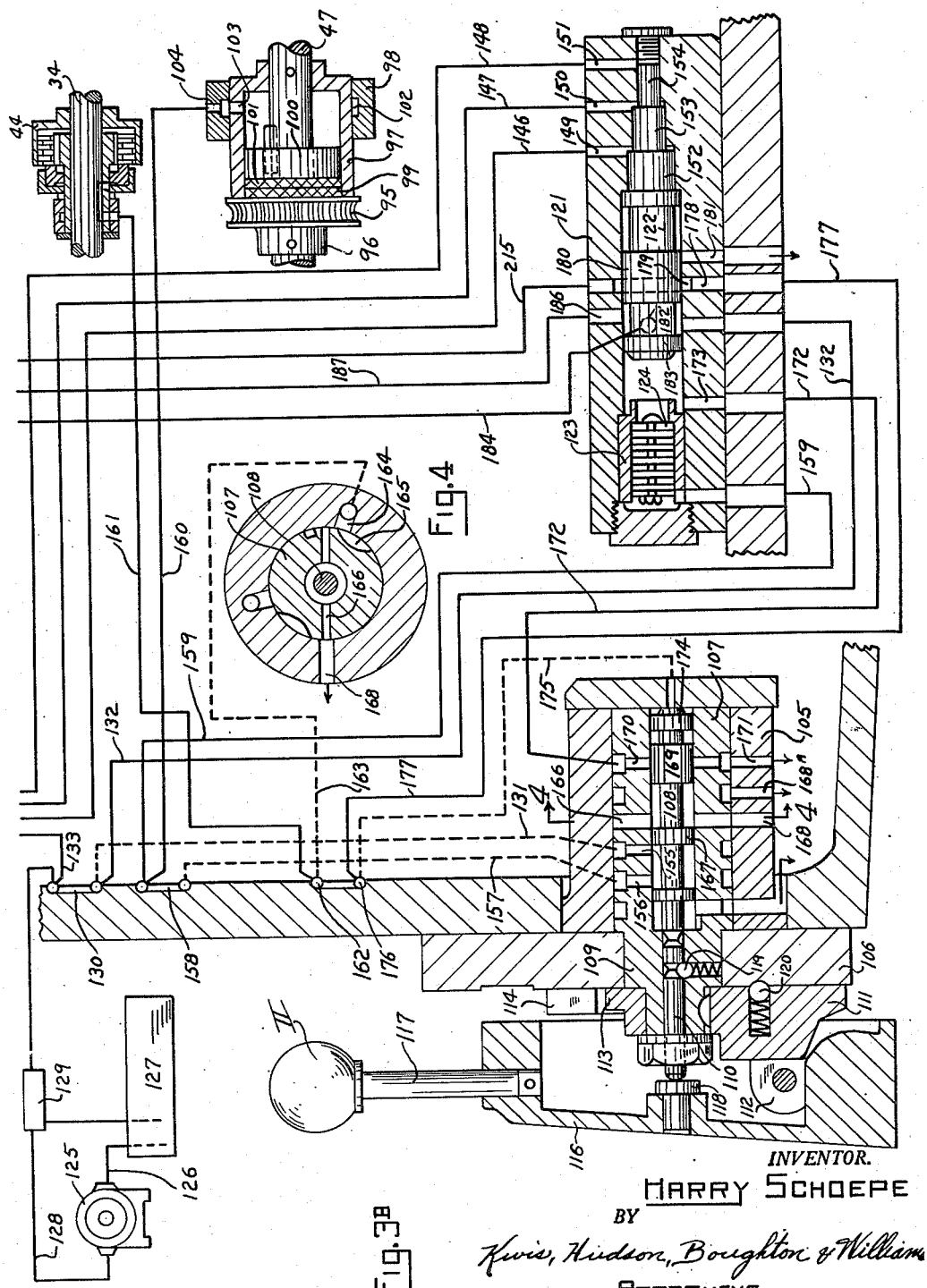
INVENTOR.
HARRY SCHOEPE
BY
Kwis, Hudson, Boughton & William
ATTORNEYS Oct. 10, 1950 H. SCHOEPE 2,525,428
MACHINE TOOL TRANSMISSION AND CONTROL
Filed July 17, 1947 6 Sheets-Sheet 4
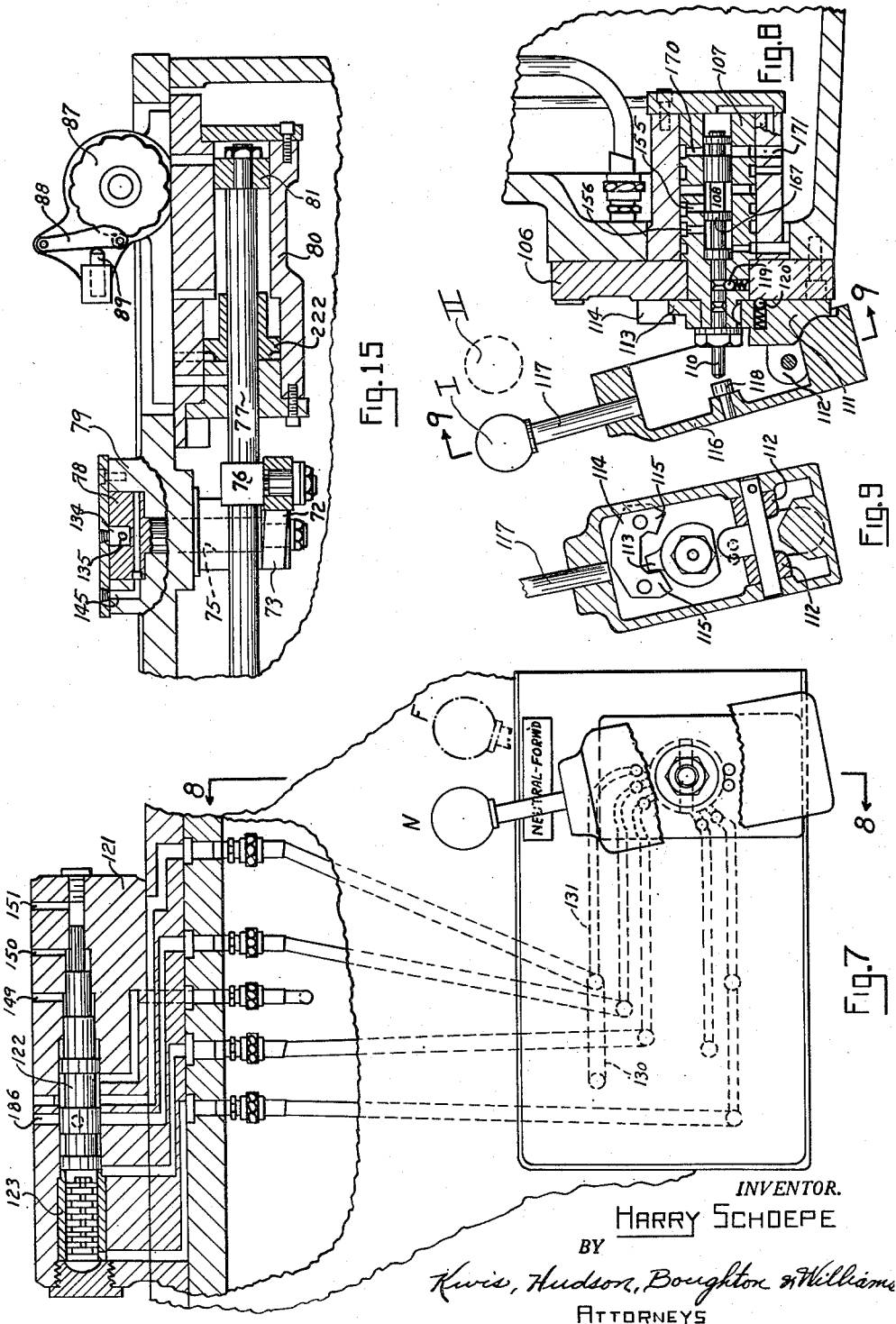
INVENTOR.
HARRY SCHOEPE
BY
Kwis, Hudson, Boughton & Williams
ATTORNEYS

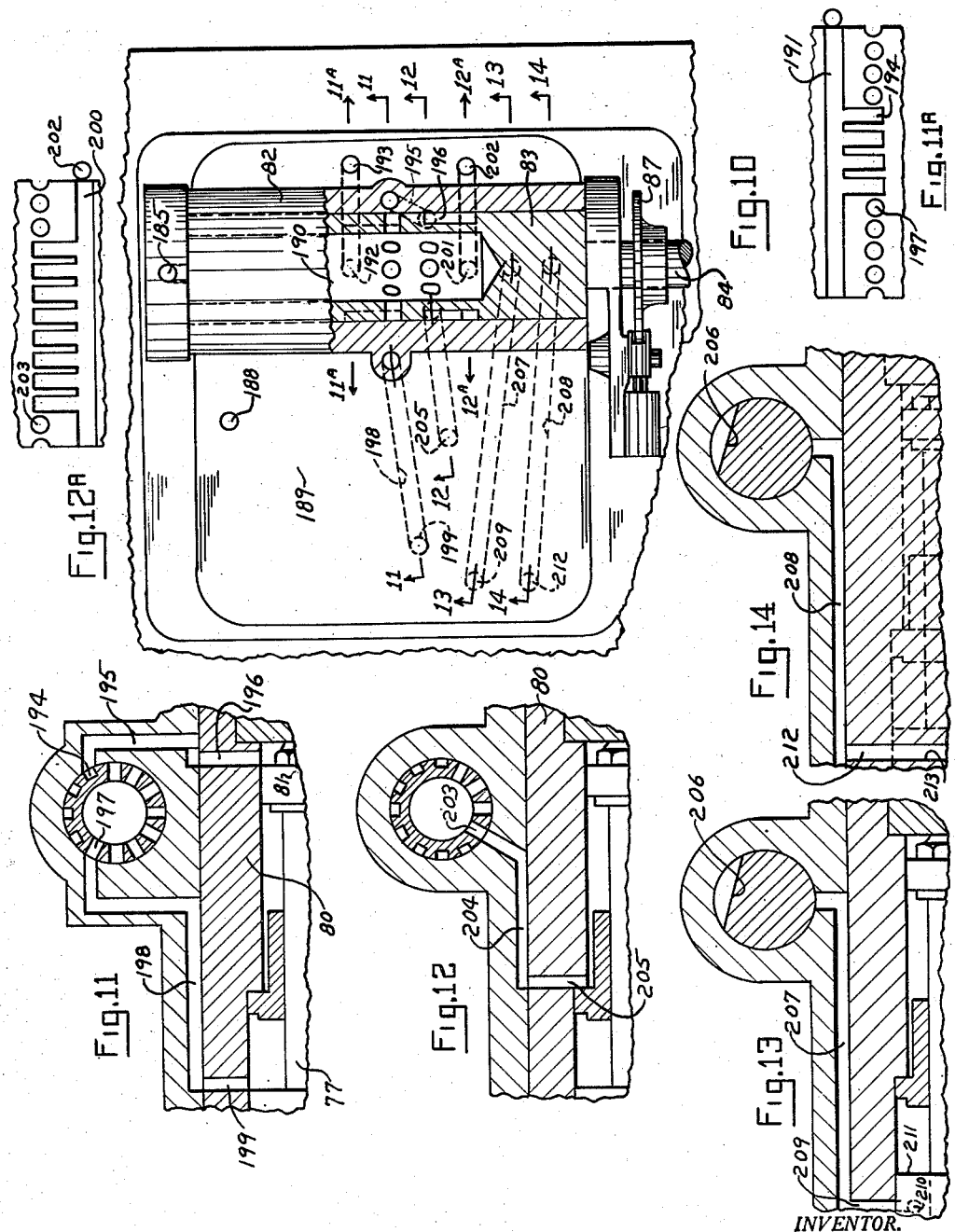

INVENTOR.
HARRY SCHOEPE
BY
Kwis, Hudson, Boughton & Williams
ATTORNEYS

Patented Oct. 10, 1950

2,525,428

UNITED STATES PATENT OFFICE 2,525,428

MACHINE TOOL TRANSMISSION AND CONTROL

Harry Schoepe, Cleveland, Ohio, assignor to The Warner & Swasey Company, Cleveland, Ohio, a corporation of Ohio Application July 17, 1947, Serial No. 761,550

12 Claims. (Cl. 192—3.5)

This invention relates to a machine tool and particularly to the change speed transmission for driving a movable part of the machine tool, such as the work spindle, and to the controls for said transmission.

An object of the invention is to provide in a change speed transmission for a movable part of a machine tool having shiftable elements, improved and novel means for facilitating the shifting of said elements without clashing or injury thereto.

Another object of the invention is to provide in the transmission for a movable part of a machine tool having shiftable change speed elements, improved and novel means for shifting said elements and wherein a slow non-working drive is imparted to said transmission and movable part immediately upon the discontinuance of the working drive thereto while a predetermined time delay proportional to said former working speed is interposed between the initiation of the slow non-working drive and the shifting of the elements, wherefore shifting of the elements does not occur until the velocity of the transmission and movable part has been reduced from said former working speed to the slow non-working drive.

A further object is to provide a machine tool transmission for driving a movable part at a plurality of different speed ranges each of which includes a plurality of different speeds and which transmission includes shiftable elements and means for imparting a slow non-working drive to the transmission and movable part preparatory to shifting said elements and wherein said slow drive is initiated upon discontinuance of the working drive while a time delay is interposed between the initiation of the slow drive and the actual shifting of the elements that is proportioned to the speed range at which the transmission and movable part were operating, wherefore greater time delay occurs before shifting the elements when the transmission and movable part have been operating in a higher speed range than occurs when they have been operating in a lower speed range, hence the elements are not shifted until the velocity of the transmission and movable part have been reduced to the slow non-working velocity.

Further and additional objects and advantages not hereinbefore specified will become apparent hereinafter during the detailed description of an embodiment of the invention which is to follow.

Referring to the accompanying drawings illustrating said embodiment:

Fig. 1 is a front elevational view of a turret lathe to the headstock transmission of which the invention is applied.

Fig. 2 is a developed view of the change speed transmission in the headstock for driving the work spindle.

Fig. 3 is a detached diagrammatic view of the mechanism for shifting the three-step gear cone which provides the plurality of speed ranges for the transmission and movable part and shows diagrammatically a portion of the hydraulic control circuit for said mechanism.

Fig. 3a is a fragmentary detail partly sectional view showing the pivotal connection for the end of the rockable shifting arm for the three step gear cone.

Fig. 3b is to be viewed in conjunction with Fig. 3 and illustrates certain of the control valves and the remainder of the hydraulic control circuit.

Fig. 4 is a sectional view taken on line 4—4 of Fig. 3b and is located within said Fig. 3b.

Fig. 5 (Sheet 1) is a detached fragmentary detail longitudinal sectional view of a portion of the time delay unit employed in conjunction with the time delay valve.

Fig. 6 (Sheet 1) is a detached sectional view taken on line 6—6 of Fig. 5.

Fig. 7 (Sheet 4) is a fragmentary front elevational view of the headstock and showing in section the time delay valve mounted in the upper portion of the headstock.

Fig. 8 is a sectional view taken on line 8—8 of Fig. 7 looking in the direction of the arrows.

Fig. 9 is a sectional view taken on line 9—9 of Fig. 8 looking in the direction of the arrows.

Fig. 10 (Sheet 5) is a view, partly in plan and partly in section, of the speed selector valve.

Fig. 11 is a sectional view through the speed selector valve, taken on line 11—11 of Fig. 10 looking in the direction of the arrows.

Fig. 11a is a developed view of the circumference of the speed selector valve body approximately at the location of line 11a—11a of Fig. 10 and indicating the port structure shown in Fig. 11.

Fig. 12 is a sectional view taken substanially on line 12—12 of Fig. 10 looking in the direction of the arrows.

Fig. 12a is a developed view of the circumference of the speed selector valve body approximately at the location of line 12a—12a of Fig. 10 and showing the port structures indicated in Fig. 12.

Figs. 13 and 14 are sectional views taken, respectively, on lines 13—13 and 14—14 of Fig. 10 looking in the direction of the arrows.

Figure 16:
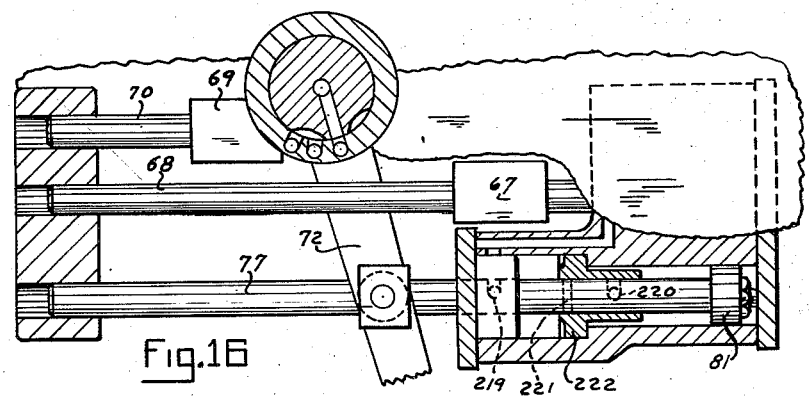
Figure 17:
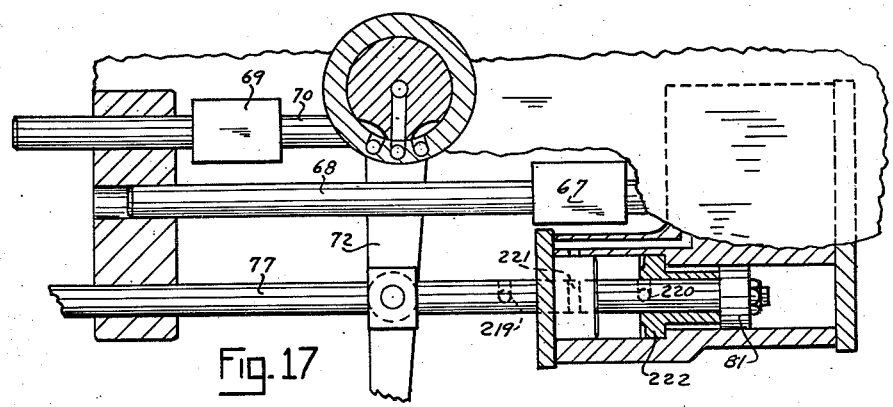
Figure 18:
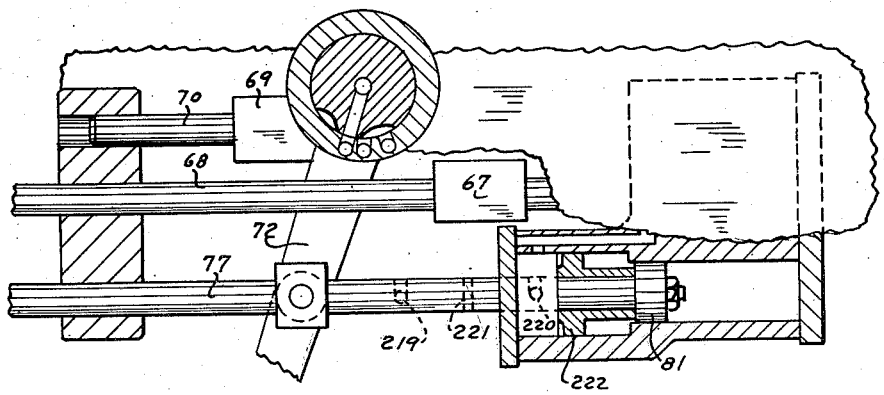

Fig. 15 (Sheet 4) is a sectional view taken substantially on line 15—15 of Fig. 3 (Sheet 2) looking in the direction of the arrows, and Fig. 15a (Sheet 1) is a fragmentary partly sectional and partly elevational view taken along irregular line 15a—15a of Fig. 3 (Sheet 2) looking in the direction of the arrows, and Figs. 16, 17 and 18 (Sheet 6) are fragmentary plan views of the headstock similar to Fig. 3 and with portions in section and illustrate the three different positions of the parts for the three different speed ranges of the transmission and work spindle, namely, Fig. 16 shows the parts in position for the slow speed range; Fig. 17 shows the parts in position for the medium speed range and Fig. 18 shows the parts in position for the fast speed range.

The present invention constitutes an improvement on the construction disclosed and described in the copending application of Crysanth M. Mirossay, Serial No. 752,353, filed June 4, 1947, now Patent No. 2,501,286, dated March 21, 1950, and to which reference may be made herein in respect to certain details of structure which per se form no part of the present invention.

In Fig. 1 there is shown a turret lathe comprising a bed 30 at one end of which is located the headstock 31. A work spindle 32 is rotatably mounted in the headstock to be driven by a change speed gearing transmission at a plurality of different speed ranges, each of which ranges includes a plurality of different speeds.

Referring to Fig. 2 wherein the change speed gearing transmission is illustrated in a developed way, it will be seen that a power source, in this instance a suitably driven pulley 33 is secured to the main drive shaft 34. A fluid pressure operated friction clutch is mounted on the shaft 34 and comprises a sleeve-like clutch member 35 keyed to the shaft and carrying in a well-known manner a series of clutch plates 36. The member 35 has fixed thereto a housing 37 in which is movably mounted a clutch actuator or piston 38. A stationary ring 39 surrounds a portion of the sleeve 35 and said ring is provided with an annular groove 40 which is always in communication with an opening 41 in the sleeve. A suitable supply conduit, later to be referred to, is connected to the stationary ring 39 and is in communication with the annular groove 40. The opening 41 in the sleeve 35 communicates with an axially extending duct 42 formed in the shaft 34 and said duct in turn communicates with a second opening 43 in the sleeve 35 which, in turn, communicates with the interior of the housing 37, wherefore the actuator or piston 38 can be subjected to pressure fluid to move the same in a clutch engaging direction. A clutch element 44 is freely rotatable on the shaft 34 and is provided with an enlarged housing portion embracing the left hand end of the sleeve 35 and which internally carries a series of clutch plates 45 interposed between the plates 36 carried by said sleeve-like clutch member 35.

It will be understood that when the piston 38 is moved by the pressure fluid toward the left the clutch plates 36 and 45 will be pressed together or engaged and hence the clutch element 44 will be driven by the shaft 34 through the sleeve clutch member 35. The clutch element 44 is provided with a hub portion having thereon a gear 46 which imparts working speed rotation or drive to the change speed transmission.

A three-gear cluster is fixed to a countershaft 47 rotatably mounted in the headstock and said cluster comprises a large gear 48 constantly in mesh with the gear 46, an intermediate and smaller gear 49 and a third and smallest gear 50. The gears 49 and 50 of the three gear cluster are adapted to be meshed, respectively, with gears 51 or 52 of a shiftable two-step gear cone or element that is splined on the spline shaft 53 rotatably mounted in the headstock.

In Fig. 2 the gear 52 is shown as in mesh with the gear 50. The spline shaft 53 also has splined thereto a second shiftable two-step gear cone or element formed of the gears 54 and 55 adapted to mesh, respectively, with gears 56 or 57 fixed to a countershaft 58 rotatably mounted in the headstock. In Fig. 2 the gears 54 and 56 are indicated as intermeshed.

From the foregoing it will be seen that four different speeds can be imparted to the countershaft 58. This countershaft 58 has fixed thereto an elongated pinion gear 59. The pinion 59 is shown in Fig. 2 as in mesh with the large gear 60 of an endwise shiftable three-step gear cone or element that is freely rotatable on a stationary shaft 61 mounted in the headstock. This three-step gear cone further includes the small gear 62 which is adapted to mesh with a large gear 63 fixed on the work spindle 32. This is the condition illustrated in Fig. 2 and it will be noted that since the drive to the work spindle from the shaft 58 is by means of a compound reduction through small gear 59, large gear 60, small gear 62 and large gear 63 then the spindle will be driven at its lowest speed range.

When the three-step gear cone on the stationary shaft 61 is shifted toward the left to bring the large gear 60 while still in mesh with the pinion 59 into mesh with a small gear 64 fixed on the work spindle 32, the small gear 62 will then be out of mesh with the large gear 63 and the large gear 60 will act as an idler between said pinion gear 59 and the gear 64. When this condition exists the spindle is driven in the intermediate speed range.

The three-step gear cone on the shaft 61 also includes a gear 65 smaller than the gear 60 but larger than the gear 62 and which when the gear cone is shifted to its most left hand position, intermeshes with the gear 57 on the shaft 58 and larger than the pinion gear 59. At this time the large gear 60 of the three-step gear cone is out of mesh with the pinion gear 59 and gear 64 and has been intermeshed with a gear 66 fixed on the work spindle 32 and hence the work spindle will be driven with a compound step-up from the shaft 58 through relative large gear 57, small gear 65, large gear 60 and smaller gear 66 and at the fast or upper speed range.

From the foregoing description it will be observed that the work spindle 32 can be driven in any one of three different speed ranges depending upon the position of the three-step gear cone on the shaft 61 and said ranges are designated herein as the high, medium and low speed ranges. It will further be noted that in each speed range the work spindle may be driven at four different speeds depending upon the positions of the two two-step gear cones on the spline shaft 53. Hence the work spindle has a total number of twelve different working speeds.

The two-step gear cone on the spline shaft 53 and formed of the gears 51 and 52 may be shifted to either one of its two operative positions by means of a fork straddling the gear cone and carried by a hub portion 67 of the fork which is fixed to a piston rod 68 slidable in the headstock, see Fig. 3 (Sheet 2). The two-step gear cone on the spline shaft 53 and formed of the gears 54 and 55 is shifted to its two operative positions by means of a fork straddling the gear 55 and formed on a hub portion 69 that is fixed to a piston rod 70 slidably mounted in the headstock. The forks which shift these two two-step gear cones, except the hubs 67 and 69, the fluid pressure motors which actuate the piston rods 68 and 70 and the passages to said motors from the speed selector valve later to be referred to have not been shown herein since they are fully disclosed in said copending application of Crysanth M. Mirossay, Serial No. 752,353 and per se form no part of the present invention.

The three-step gear cone on the shaft 61 and formed of the gears 60, 62 and 65 is shifted to its three operative positions by means of a pivoted shoe fitting the groove 71 (see Fig. 3) in the three-step gear cone and carried by the end of a rockable arm 72, the opposite end of which is in the form of a fork 73 (see Fig. 3a) having flat surfaces straddling a flat surface portion 74 of a vertically extending pin 75 that is rockably supported in the headstock cover (see Fig. 15, Sheet 4). It will be seen that rocking of the arm or lever 72 will rock the pin 75 but at the same time the arm can have limited and relative endwise movement with respect thereto. The lever or arm 72 intermediate its ends is pivotally connected as indicated at 76 to a piston rod 77 slidably mounted in the headstock. The rockable pin 75 has connected to it to rock therewith a valve body 78 located within a fixed valve housing 79 carried by the headstock cover. This valve may be designated as the speed range controlled valve and the ports and passages thereof will be described in detail hereinafter.

As fully described in said copending application Serial No. 752,353, the piston rods 68, 70 and 77 are extended from three pressure fluid motors, only one of which need be indicated in detail herein, namely the motor 80 which mounts the piston 81 for moving the piston rod 77 to effect the shifting of the three-step gear cone. The operation of the three pressure fluid motors just referred to is controlled by a speed selector valve 82 mounted on the headstock cover, see Figs. 3 (Sheet 3), and 10 to 14 inclusive (Sheet 5). The speed selector valve 82 comprises a valve body 83 (Fig. 10) rotatable in the valve housing, the said housing and body containing port and passage arrangements later to be explained in further detail. The valve body 83 has a shaft 84 extending outwardly of the valve housing and coupled to a shaft 85 rotatably carried by the upper part of the headstock and extending beyond the front thereof where it is provided with a hand wheel 86, see Fig. 1. It will thus be seen that rotation of the hand wheel 86 will cause rotation of the valve body 83 of the speed selector valve.

The shaft 84 has fixed thereto a disk 87 provided on its periphery with twelve circumferentially spaced detent notches corresponding to the twelve speeds of the work spindle (see Fig. 10, Sheet 5, and Fig. 15, Sheet 4). A roller carried at the lower end of a pivoted arm 88 cooperates with said detent notches at all times since said arm is urged toward the circumference of the disk by a spring pressed plunger 89. Thus the valve body of the speed selector valve will be held in any one of its twelve selected speed positions.

The shaft 85 is operatively connected adjacent its forward end to the shaft of an indicator 90 carried by the headstock and showing spindle speeds in relation to cutting speeds in feet per minute for different diameters of work and correlated to the selected speed positions of the speed selector valve body 83.

In order to impart to the transmission a slow non-working speed preparatory to shifting the gear cones to change the speed of the work spindle the following arrangement is provided (see Fig. 2, Sheet 1). A shaft 91 is rotatably mounted in the headstock and extends transversely of the shaft 47 and has fixed to one of its ends a bevel gear 92 which meshes with a bevel gear 93 fixed to the main drive shaft 34. The shaft 91 has fixed thereto a worm 94 which meshes with a worm wheel 95 (see Fig. 3b, Sheet 3) that is freely rotatable on the shaft 47 intermediate a collar 96 fixed to said shaft 47 and a housing or cylinder 97 which also is fixed to the shaft 47 to rotate therewith and is mounted within a stationary ring 98 carried internally of the headstock. The worm wheel 95 on its side adjacent to the cylinder 97 and within the open end of said cylinder is provided with friction clutch plate material 99. A piston 100 is splined on the shaft 47 and is slidable within the cylinder and is provided on its face adjacent to the worm wheel 95 with friction plate material 101, wherefore it will be seen that when the piston 100 is moved by fluid pressure toward the left as viewed in Fig. 3b, the friction plates 99 and 101 will be engaged and hence the worm wheel 95 will act to rotate said piston 100 and shaft 47 to drive the transmission at a slow non-working speed.

The stationary ring 98 is provided in its internal circumference with a circular groove 102 which is always in communication with a port 103 formed in the cylinder 97. The groove 102 in the stationary ring is also in communication with a port 104 which, as will later be explained, is connected to a pressure fluid supply pipe.

In addition to the speed selector valve 82 and the speed range controlled valve 79, a main control valve including the gear shifting cycle valve, and a time delay valve are employed in the hydraulic control circuit (see Figs. 3b, 7 and 8). The main control valve 105 is carried by a plate 106 that is bolted or otherwise secured to the front of the headstock, with the housing of the main control valve 105 extending through an opening in the front wall of the headstock. The main control valve 105 is provided with a valve chamber in which is rockably mounted a valve body 107 controlling the main drive clutch and which body in turn is provided with a valve chamber in which is slidably mounted a gear shifting cycle control valve body 108. The rockable main drive clutch control valve body 107 is provided with a hub-like portion 109 that extends outwardly of the valve housing through and beyond an opening in the plate 106 and is rockably supported in said opening. The slidable gear shifting cycle control valve body 108 is provided with an extension 110 which passes through the hub portion 109 and extends beyond the outer end of the same.

Keyed to the reduced outer end of the hub portion 109 of the rockable valve body 107 is a handle bracket 111 which has two downwardly extending spaced leg portions each provided with a forwardly extending lug 112 (see Figs. 8 and 9, Sheet 4). The bracket 111 is provided on its upper side with an upwardly extending lug 113. A stop plate 114 is bolted or otherwise secured to the front side of the plate 106 and is provided with downwardly extending stop lugs 115 lying on opposite sides and in the path of the rocking movement of the stop lug 113 and defining the maximum rocking movement in opposite directions which can be imparted to the bracket 111 and the rockable valve body 107. A handle body 116 is pivotally connected to the forwardly extending lugs 112 of the bracket 111, wherefore said handle body can be rocked inwardly and outwardly relative to the front face of the plate 106. The handle body 116 carries at its upper end a handle 117 and said handle and said handle body hereinafter will be referred to conjointly as the handle. The handle above its pivot is provided with an abutment pin 118 which is aligned with the extension 110 of the slidable gear shifting cycle control valve body 108 when the handle is in its normal position I, indicated by full lines in Fig. 8. When the handle is rocked inwardly from its normal position I to position II, that is, to the position shown in Fig. 3b, the abutment pin 118 acts on the extension 110 to shift the slidable valve body 108 from its most left hand position shown in Fig. 8 to its most right hand position shown in Fig. 3b. It will later be pointed out that the pressure fluid acts automatically on said slidable valve body 108 at the end of the gear shifting cycle to move said body outwardly or toward the left and thus restore the handle from position II to its normal position I.

It will be noted that the handle 117 can be rocked laterally from forward to neutral position, i. e., positions F and N or vice versa, to rock the rockable valve body 107 of the main drive clutch control valve. A spring point 119 carried by the reduced hub portion of the rockable valve body 107 cooperates with spaced notches in the extension 110 of the slidable cycle valve body 108 to hold said valve body in its two endwise shifted positions corresponding to handle positions I and II. The handle bracket 111 is provided with a spring-pressed ball detent 120 which cooperates with two recesses formed in the plate 106 (see Fig. 7) to hold the handle 117 in either one of its two laterally rocked positions, i. e., position F or position N.

The upper part of the headstock mounts a time delay valve 121, the housing of which is provided with a valve chamber slidably mounting a valve body 122 and also having at the left hand end of the chamber a time delay unit 123. The time delay unit 123 is inserted into the housing of the time delay valve 121 from said left hand end thereof and comprises a cup-like member containing a series of baffle disks 124 carried on a rod extending therethrough and with said disks having peripheral notches staggered with respect to each other (see Figs. 5 and 6) and providing tortuous paths through the device for the pressure fluid, wherefore it will take a predetermined time period for the pressure fluid to flow through the unit and into the chamber of the time delay valve. The details of the main control valve, the gear shifting cycle control valve, the time delay valve, the speed selector valve and the speed range control valve will be described in connection with the hydraulic circuit now to be explained.

Referring to Fig. 3b, the hydraulic circuit includes a pump 125, the input side of which is connected by a pipe 126 with a diagrammatically shown sump or reservoir 127 which may be actually the lower portion of the headstock casting. The output side of the pump 125 is connected with a pipe 128 having therein a relief valve 129 as will be well understood and which valve is connected with the sump or reservoir. The pipe 128 extends to a passage or milled groove 130 which is shown in Fig. 7 as located on the inner side of the plate 106, although in Fig. 3b for purposes of convenience as to space said passage or groove is shown on the rear side of the headstock wall. The groove 130 is connected by an inlet groove 131 with the valve chamber of the main drive clutch control valve 105. The groove 130 is also connected to a pipe 132 which extends to the time delay valve 121 and is the inlet pipe for said valve. The groove 130 is connected by a pipe 133 to the inlet of the speed range control valve 79 (see Fig. 3). The pipe 133 communicates with a bore 134 formed centrally of the rockable valve body 78 of the speed range control valve. The body 78 is provided with a radial passage 135 extending from the bore 134 to the periphery of the valve body and always communicating with one or the other of three ports 136, 137 and 138. The valve body 78 is provided in its periphery with exhaust recesses 139 and 140 so arranged as to be in communication with the two of the ports 136, 137 and 138 which are currently not connected with the radial passageway 135. The recesses 139 and 140 are connected by drilled holes 141 and 142 with a drilled chordal-like passage 143 dead-ended at one end and having its other end terminating in a circumferentially extending recess 144 which always communicates with the exhaust or drain passage 145 formed in the valve housing 79. Hence two of the three ports 136, 137 and 138 will always be connected to exhaust.

The ports 136, 137 and 138 are connected by pipes 146, 147 and 148, respectively, to ports 149, 150 and 151 formed in the housing of the time delay valve 121 and communicating with the valve chamber. It will be noted that the valve chamber of the time delay valve has four bores of different diameter, namely, one in which the main portion of the valve body slides while the other three bores slidably receive reduced portions of the valve body indicated as portions 152, 153 and 154, said portions decreasing in diameter in the order named with the right hand ends of such portions being pistons of different projected areas against which the pressure fluid from one or another of the ports 149, 150 and 151 act depending upon which of the pipes 146, 147 and 148 are connected to the inlet side of the speed range controlled valve 79. Since one of the conduits 146, 147 and 148 is always connected to the inlet side of the valve 79 there will always be pressure fluid acting on the slidable body 122 of the time delay valve tending to restore and maintain said valve in its most left hand or normal position. Therefore it will be seen that in order to move the valve body 122 from its normal position toward the right and into the position shown in Fig. 3b different fluid pressures will be required depending upon which reduced piston portion at the right hand end of the valve body is being acted on by the pressure fluid to oppose the movement of the valve body from its normal position and to the right. In other words, if pressure fluid is acting on the largest reduced portion 152 it will require the build up of greater pressure on the left hand end of the valve body to move the latter toward the right than it would if the pressure fluid was acting on the intermediate portion 153 or the smallest portion 154. Hence different time delay periods are produced before the valve body 122 moves toward the right after the cycle valve body 108 has been moved to its most right hand position.

The inlet groove 131 to the main control valve is connected through the rockable valve body 107 by ports 155 and 156 with a groove 157 when the handle 117 is rocked inwardly to position II and the cycle valve body 108 is shifted to the position shown in Fig. 3b. The groove 157 extends to a groove 158 formed in the plate 106 and said groove 158 is connected by a pipe 159 to the left hand end of the time delay unit 123 of the time delay valve. Hence when this condition occurs pressure fluid will be flowing to the time delay unit 123 and will pass through said unit with a predetermined time delay and into the valve chamber of the time delay valve to the left of the valve body 122 to build up pressure sufficient to overcome the resistance of the pressure fluid on one or the other of the piston portions 152, 153 and 154 before shifting the valve body 122 from its normal left hand position into its right hand position as indicated in Fig. 3b. Hence it will be apparent that three different periods of time delays will occur between the shifting of the cycle valve body 108 to its right hand position and the shifting of the valve body 122 of the time delay valve to its right hand position. Immediately upon the shifting of the cycle valve body 108 to its right hand position pressure fluid flows through the groove 157, groove 158 and pipe 160 to the port 104 in the stationary ring 98 and thence into the cylinder 97 to shift the piston 100 into clutch engaging position with the worm wheel 95.

Assuming that the transmission and work spindle are coasting subsequent to disengagement of the main drive clutch, slippage will occur between the friction plates 99 and 101 until the velocity of the transmission and work spindle has come down to the slow non-working speed, at which time the friction drive takes effect and the transmission commences to rotate at the slow non-working speed. When the machine is idle and the transmission is not rotating at the time the piston 100 is clutched to the worm wheel 95, then the initiation of the slow non-working drive takes place immediately.

The main drive clutch on the shaft 34 is connected by a pipe 161 with a groove 162 and in turn by a further groove 163 which extends to a port 164 in the housing 105 of the main control valve. The port 164 communicates with a drain recess 165 when the rockable valve body 107 has been rocked to neutral position. When said rockable valve body has been rocked to forward position then a diametrically extending passage 166 in said body communicates with the port 164 and with the valve chamber in which the cycle valve body slides. It will be seen that when the cycle valve body is in its normal left hand position as indicated in Fig. 8 the land 167 of said valve body 108 is located intermediate the ports 155 and 156 and hence the inlet port 155 is in communication with the passage 166. Therefore at this time if the valve body 107 is rocked to forward position said passage 166 will be connected with port 164 and pressure fluid flows to the main drive clutch to engage the same. Conversely, if the valve body 107 is rocked to neutral position then the port 164 communicates with the drain recess 165 while the passage 166 communicates with a drain port 168 in the valve housing 105 and at such time the main drive clutch is disengaged. It will be noted, however, that even though the rockable valve body 107 has been rocked to forward position to effect engagement of the main drive clutch the instant the cycle valve body 108 is shifted to its right hand position (as indicated in Fig. 3b) by movement of the lever 117 from position I to position II then the land 167 breaks communication between the inlet port 155 and the passage 166 and hence the flow of pressure fluid to the main drive clutch is terminated and said drive clutch is disengaged, the pressure fluid in the lines to the main drive clutch being now free to drain between the land 167 and the wide land 169 of the valve body 108 and through the passage 166 and port 168a which is displaced from the port 168, it being understood that a suitable longitudinally extending groove connects the passage 166 with a circumferential groove in the valve and which is in communication with the port 168a.

The valve body 107 is provided with a diametral passage 170 which in either rocked position of the valve body is in communication with a drain passage 171 in the housing 105 and with a pipe 172 which extends to a port 173 in the housing of the time delay valve 121 and which port communicates with the valve chamber at the right hand end of the time delay unit 123. It will be seen that when the cycle control valve 108 is in its normal position as indicated in Fig. 8 the passage 170 in the valve body 107 communicates with the valve chamber between the wide land 169 and the right hand narrow land 174, wherefore the port 173 and pipe 172 will be in communication with the drain passage 171 irrespective of the rocked position of the valve body 107, thus permitting the time delay valve body 122 to be restored by the pressure on one of the three piston portions at its right hand end. Conversely, when the cycle control valve body 108 is moved to its right hand position as indicated in Fig. 3b the wide land 169 closes the passage 170 and hence at this time pipe 172 and the valve chamber intermediate the time delay unit 123 and the left hand end of the time delay valve body 122 is not connected to drain.

The right hand end of the valve chamber in the rockable valve body 107 is connected to a groove 175 which extends to a groove 176 to which a pipe 177 is connected and said pipe extends to and is connected with a radial passage 178 in the housing of the time delay valve and which radial passage connects with an annular groove 179 in the internal circumference of the valve chamber. It will be noted that when the time delay valve body 122 is in its right hand position as shown in Fig. 3b that its wide land 180 interrupts passage 181 in the valve housing and which extends to drain but when the valve body 122 is in its normal left hand position as shown in Fig. 7 then the drain passage 181 is unblocked and at such time pressure fluid in the radial passage 178 and the annular groove 179 is free to flow through the valve chamber and the drain passage 181 to drain for a purpose later to be explained.

The valve body 122 of the time delay valve is provided with a port 182 which communicates with the valve chamber and is shown in the normal position of the valve body as indicated in Fig. 7 as closed by the wide land 180 but in the right hand position of the valve body as indicated in Fig. 3b as uncovered and located between the wide land 180 and the right hand land 183 of the valve body 122. The port 182 is connected by a pipe 184 with a port 185 in the rear end of the speed selector valve 82 and later to be referred to.

The housing of the time delay valve 121 is provided with a passage 186 communicating with the valve chamber and closed by the wide land 180 of the valve body when said body is in its normal left hand position as indicated in Fig. 7.

The passage 186 when the valve body is in its right hand position is intermediate the lands 180 and 183 and hence in communication with the valve chamber, it being noted that said passage 186 is so disposed relative to the port 182 that during the movement of the valve body toward the right pressure fluid will first flow through said port 182 and pipe 184 and shortly thereafter will flow from the valve chamber through the passage 186 and a pipe 187 that extends to a drilled opening or passage 188 in the supporting plate 189 for the speed selector valve 82.

The speed selector valve 82 is mounted on the plate 189 which overlies the three pressure fluid motors that actuate the piston rods 70, 68 and 77 and hence the valve housing, said plate and the housings of the fluid pressure motors can be provided with grooved passages, drilled openings and the like forming short conduits for the pressure fluid and without requiring the use of piping for such purpose, all as clearly shown and described in said copending application Serial No. 752,353.

The rotatable body 83 of the speed selector valve is provided with a bore 190 that extends part way through the body from the rear end thereof and is in communication with the port 185. The valve body is provided throughout its length with a plurality of circularly spaced radial ports connecting with the bore 190 and with a plurality of cylindrical recesses or grooves having axially extending branch grooves in the periphery of the valve body, all as fully described in said copending application Serial No. 752,353.

It will be understood that the valve body has twelve different operative positions since there are twelve operative speeds for the spindle. It will not be necessary herein to describe the ports, grooves and passages which connect the valve with the motors for the piston rods 68 and 70 that shift the two two-step gear cones since this is clearly shown and described in said copending application Serial No. 752,353 and per se forms no part of the instant invention.

Referring to Figs. 10, 11 and 11a it will be seen that the portion of the valve included in the proximity of the lines 11a—11a and 11—11 contains eight radial ports and four lateral extensions from a circular groove 191 that overlies an opening and groove 192 in the valve housing and which communicates with a drilled opening 193 that leads to the sump. The lateral extension 194 of the four extensions communicates in the valve body position shown with a drilled opening and groove 195 in the valve housing and extending to the drilled opening 196 in the housing of the pressure fluid motor 80 and which latter opening communicates with the right hand end of the narrow portion of the cylinder of said motor. The lateral port 197 of the eight radial ports in said position of the valve body 83 communicates with the drilled opening and groove 198 in the valve housing and the latter in turn with the drilled opening 199 in the housing of the motor 80 and extending to the left hand end of the large portion of the cylinder of said motor.

Referring to Figs. 10, 12 and 12a it will be seen that the portion of the valve body adjacent the lines 12—12 and 12a—12a is provided with four radial ports and eight lateral extensions from the annular groove 200. The annular groove 200 overlies a drilled opening and groove 201 in the valve housing which extends to an opening 202 in the casting and communicating with the sump. The radial port 203 in this position of the valve communicates with a drilled opening and groove 204 in the valve housing and extending to the drilled opening 205 in the housing of the motor 80 which communicates with the end of the smaller bore portion of the cylinder that is immediately adjacent the large bore portion thereof.

Referring to Figs. 10, 13 and 14 it will be seen that the periphery of the valve body 83 adjacent the lines 13—13 and 14—14 is provided with a flat 206 extending axially of the body and forming with the wall of the valve chamber an axially extending passageway which when the body is turned and the flat overlies the drilled openings and grooves 207 and 208 will bridge said openings and place the same in communication with each other. The drilled opening and groove 207 communicates with a drilled opening 209 in the housing of the motor 80 which communicates with a drilled opening 210 in the cylinder head 211 of the motor 80. The drilled opening and groove 208 communicates with a drilled opening 212 formed in the housing of the motor 80 and which communicates, in turn, with a drilled opening 213 in the cylinder head 211. The drilled opening 210 (see Fig. 15a, Sheet 1) communicates with a drilled opening 214 extending at right angles thereto and formed in the cylinder head 211 and in the housing of the motor 80 and connected to the pipe 215. It will be noted that the openings 213 and 214 communicate with the bore for the piston rod 77, said openings being spaced 90° apart for a purpose later to be explained. The pipe 187 is connected to the opening 188 formed in the plate 189 and communicating with an opening and groove 216 formed in the housing for the motor 80 (see Fig. 3, Sheet 2). The opening and groove 216 extends to and communicates with an opening 217 formed in the housing of the motor 80 and communicating, in turn, with a drilled opening 218 which extends through the cylinder head to the bore for the piston rod 77 and is aligned with the opening 213.

The piston rod 77 of the three-position motor 80 is provided with longitudinally spaced L-shaped openings 219 and 220 therethrough and intermediate said L-shaped openings with a diametral opening 221. It will be seen that when the piston 81 is in its most right hand position the L-shaped opening 219 in the piston rod 77 will register with the openings 218 and 214 (see Fig. 16, Sheet 6). When the piston 81 is in its intermediate position the diametral opening 221 will register with the openings 218 and 213 (see Fig. 17), while when the piston 81 is in its most left hand position the L-shaped opening 220 will be in alignment with the openings 218 and 214 (see Fig. 18).

The piston rod 77 of the motor 80 has slidably mounted thereon within the motor cylinder a stop piston 222 in the form of a headed sleeve with the head sliding in the large bore portion of the cylinder.

Referring to Figs. 3 and 16, the piston is shown in its most right hand position and at this time the arm 72 has been rocked toward the right and into the low speed range position. Assuming that it is desired to move the piston 81 to its intermediate position and that pressure fluid is flowing into the cylinder to the right of the piston 81 through the opening 196 and to the left of the stop piston 222 through the opening 199, it will be seen that the stop piston will be moved to the limit of its right hand movement, while the piston 81 will be moved toward the left until it engages the right hand end of the sleeve of the stop piston, whereupon further movement of the piston 81 toward the left will be arrested due to the area differentials between the piston 81 and the head of the stop piston 222. This condition is clearly illustrated in Fig. 17 and at this time the arm 72 is in its intermediate gear shifting position which is the position it occupies when the three-step gear cone is set in the intermediate speed range.

When it is desired to move the piston 81 to its most left hand position, as indicated in Fig. 18, i. e., to the position when the three-step gear cone is set for the high speed range, then pressure is admitted to the right of the piston 81 through the opening 196 and is exhausted from the left of the stop piston 222 through the opening 199 and likewise is exhausted from the opening 205, whereupon the piston and the stop piston move as a unit toward the left until they have reached the left hand limit of movement as indicated in Fig. 18. When it is desired to move the piston 81 from its most left hand position to its intermediate position, pressure fluid is admitted to the left of the stop piston 222 through the opening 199 and continues to be admitted through the opening 196 to the right of the piston 181, whereupon due to the area differentials the stop piston moves toward the right together with the piston 81 from the position shown in Fig. 18 to the position shown in Fig. 17, it being understood that at this time the piston 81 is held against further right hand movement by the fluid pressure entering the cylinder through the opening 196.

When it is desired to shift the piston 81 from the intermediate position of Fig. 17 to its most right hand position of Fig. 16 then fluid is exhausted through the opening 196 and is admitted through the opening 205, whereupon the piston 81 moves toward the right and away from the stop piston 222 until it is in its most right hand position.

It will be understood that the different operative positions of the piston 81 just referred to moves the piston rod 77 and the rockable arm 72 to three different positions corresponding to the high, intermediate and low speed ranges and such movement of the arm 72 rocks the speed range controlled valve body 78 to place the passage 135 in communication with the ports 136, 137 or 138 and the pipes 146, 147 and 148, respectively, to cause pressure fluid to flow to the time delay valve behind either the piston portion 152 or 153 or 154 to provide the greatest, intermediate or least resistance to the right hand movement of the time delay valve body to result in the longest, intermediate or shortest time delay between the initiation of the slow non-working speed and the shifting of the three step gear cone.

In order to coordinate and clarify the description hereinbefore given a resumé of the operation of the machine will now be set forth. Assuming that the pulley 33 and shaft 34 are being power driven and that the pump 125 is operating so that the pressure fluid system can function and that a work piece is mounted in the chuck of the work spindle while the control handle 117 is in positions I and N, that is, normal and neutral positions, at which time the main drive clutch is disengaged as is also the clutch for the slow non-working drive and the transmission is idle, then the operator turns the hand wheel 86 to set the speed selector valve 82 for the desired spindle speed in relation to the diameter of the work in accordance with the cutting speed in feet per minute of the tool. It will be assumed that the spindle speed selected corresponds to the setting of the valve 82 as shown in Figs. 3 and 10 to 14 inclusive, that is, to a speed wherein the three-step gear cone will be positioned for the low speed range. Inasmuch as the control handle is in positions I and N this setting of the speed selector valve 82 does not cause the gear cones to be shifted since said speed selector valve is receiving no pressure fluid at this time. As soon as the operator moves the control handle 117 inwardly from position I to position II the gear shifting cycle control valve body 108 is shifted from its normal position to its most left hand position, i. e., from the position of Fig. 8 to the position of Fig. 3b and the spring detent 119 will hold the valve body 108 in its shifted position. The shifting of the valve body 108 initiates the gear shifting cycle since it causes the pressure fluid to flow from supply groove 131 into the groove 157 and thence through groove 158 and pipe 160 to the cylinder 97 to clutch the piston 100 to the worm wheel 95 which is currently driven from the main drive shaft, whereupon the shaft 47 rotates at the slow non-working drive as do also all of the gears of the transmission and the work spindle. Simultaneously the pressure fluid flows from the groove 158 through pipe 159 and into the time delay unit 123. At this time the pipe 172 which communicates with the valve chamber of the time delay valve to the right of the time delay unit is deadened by the wide land 169 of the cycle valve body 108. Therefore the pressure flowing through the time delay unit 123 builds up to the left of the valve body 122 of the time delay valve. The operation of the machine started at the beginning of a new work cycle and with the transmission and spindle at rest and hence not having high velocities which must be brought down to slow non-working speed.

It will be assumed that the last speed in the previous work cycle at which the spindle had operated was in the high speed range so that the passage 135 of the speed range controlled valve body 78 was in communication with the port 136 and the pipe 146 so that pressure fluid is flowing into the time delay valve to the right of the piston portion 152 through pipe 133, passage 135, port 136 and pipe 146. Therefore the movement of the valve toward the right, due to the pressure fluid on its left hand end, is resisted by the pressure fluid acting on the largest piston portion 152, and consequently maximum time is required to build up sufficient pressure to move the valve body toward the right and into a position wherein pressure fluid will flow to the speed selector valve 82 and to the fluid pressure motors to actuate the latter and effect the shifting of the gears.

When the shifting has been completed and the L-shaped passage 209 in the piston rod 77 will register with the ports 218 and 214 and pressure fluid will flow through the pipe 215 and into the annular groove 179 in the time delay valve, around the wide land 80 and thence outwardly of the port 178 and through pipe 177 to groove 176 and thence through groove 175 to the right hand end of the cycle valve body 108, whereupon said valve body will be shifted automatically toward the left to its normal position and the control lever 117 will be shifted to position I. At this time pressure fluid ceases to flow into the time delay unit 123 while the port 173 and pipe 172 are connected to drain, whereupon the pressure fluid acting on the smallest portion 154 of the time delay valve body moves said body from its right hand position to its normal left hand position, it being understood that the passage 135 of the speed range controlled valve 78 is now in communication with port 138 and pipe 148. At this time the land 167 of the cycle control valve 108 is intermediate the ports 155 and 156 so that port 155 is in communication with the passage 166 of the rockable valve body 107 and said passage communicates with drain. Therefore as soon as the operator swings the control lever 117 from position N to position F passage 166 registers with port 164 and pressure fluid flows through groove 163, 162 and pipe 161 to the main drive clutch to engage said clutch, whereupon the transmission is operating at the selected working speed in the low speed range. It will be understood that the movement of the cycle control valve body 108 toward the left to its normal position has disconnected the pressure fluid from the cylinder 97 to disengage the slow non-working drive to the transmission.

It will be noted that the time delay valve body having been moved to its normal left hand position, the wide land 180 thereof is to the left of port 178, hence the pressure fluid flows from groove 179 to drain passage 181 and therefore fluid pressure on the right hand end of valve body 108 is relieved so this latter valve body can be moved inwardly again when desired. The machine is now operating at the selected speed in the slow speed range and hence pressure fluid continues to be exerted on the portion 154 of the time delay valve body 122. During the operative step at this speed and in this range the operator can turn the handle 86 to set the speed selector valve 82 for the speed desired in the next operative step which will be assumed to be in the high speed range. As soon as the first operative step is completed the operator can move the handle 117 while in position F inwardly from position I to position II to shift the cycle control valve body 108 into the position shown in Fig. 3a. This results in disconnecting the pressure fluid to the main drive clutch and effecting the disengagement thereof and in connecting the pressure fluid to the cylinder 97 and to the time delay unit 123 and in blocking the drain from the delay valve through the pipe 172. It will be understood that since the transmission was operating in the low speed range during the first step that its velocity is relatively low and hence less time will be required for the velocity of the transmission and work spindle to be reduced from its working velocity to the velocity of the slow non-working speed preparatory to shifting the gears. Therefore since the pressure fluid is effective on the smallest portion 154 of the time delay valve body said body will be shifted from its normal position to its most right hand position in the minimum time period, since it takes less time to build up sufficient pressure on the left hand end of the valve body to overcome the resistance against its right hand movement caused by the smallest portion 154. Of course as soon as the time delay valve body 122 has shifted to its right hand position pressure fluid flows to the speed selector valve and the gears are shifted to obtain the selected speed for the second step.

The transmission is now operating in the high speed range. Assuming that the next operative step is in the intermediate range, then it will be noted that the longest time delay occurs in the shifting of the time delay valve body since the transmission and work spindle will have been operating with a high velocity requiring the greatest time period to reduce it to the slow non-working speed velocity preparatory to shifting the gears.

Similarly, assuming that the fourth operative step is in the low speed range, then the shift from the intermediate speed range used in the third operative step to the low speed range will require an intermediate time delay in reducing the velocity of the transmission and work spindle from the intermediate speed range to the slow non-working speed and therefore the pressure fluid acting on the portion 153 of the time delay body will provide this intermediate time delay.

It will be seen from the foregoing that a time delay is interposed between the shifting of the cycle control valve body to initiate the slow non-working speed which is directly proportional to the speed range of the transmission and work spindle for the previous operative step. Hence, the time delay between the inward movement of the control handle from position I to position II and the actual shifting of the gear cones is directly proportional to the velocity of rotation of the transmission and work spindle. Therefore, it is always assured that the velocity of the transmission and work spindle will be reduced to the slow non-working speed velocity before the gear shifting occurs. This eliminates gear clashing, facilitates shifting, and protects the gear teeth, thus prolonging the life and accuracy of the gears.

Although a preferred embodiment of the invention has been illustrated and described herein it will be understood that the invention is susceptible of various modifications and adaptations within the scope of the appended claims.

Having thus described my invention, I claim:

1. In a machine tool having a movable part, a change speed transmission for moving said part at different operating speeds and including shiftable gears, a power drive for said transmission, means for rendering said drive effective or ineffective, means for selectively shifting said gears to obtain different operating speeds, and means for controlling said first means and said second means and including means for interposing automatically between the rendering of the power drive ineffective and the shifting of the gears different time delays each of which is proportional to a different one of the different operating speeds.

2. In a machine tool having a movable part, a change speed transmission for moving said part at different operating speeds and including shiftable gears, a power drive for said transmission, means for rendering said drive effective or ineffective, means for selectively shifting said gears to obtain different operating speeds, and means for controlling said first means and said second means and including means acting during each speed change for interposing automatically between the rendering of the power drive ineffective and the shifting of the gears a time delay which is proportional to the previous operating speed.

3. In a machine tool having a movable part, a change speed transmission for moving said part at different speeds and including shiftable gears, means for imparting working speed drive to said transmission, means for imparting a slow non-working drive to said transmission, means for selectively rendering said working speed drive and said slow non-working speed drive effective or ineffective, means for selectively shifting said gears to obtain different speeds, and means for controlling the previously named means and including means for causing automatically after the working speed drive has been rendered ineffective and the non-working speed drive rendered effective and prior to the shifting of the gears different time delays each of which is proportional to a different one of the different speeds.

4. In a machine tool having a movable part, a change speed transmission including shiftable gears for moving said part at a plurality of different speed ranges with each range including a plurality of different speeds, a power drive for said transmission, means for rendering said drive effective or ineffective, means for selectively shifting said gears to obtain different speed ranges and different speeds in said ranges, and means for controlling said first means and said second means and including means for interposing automatically between the rendering of the power drive ineffective and the shifting of the gears different time delays each of which is proportional to a different one of the different speed ranges.

5. In a machine tool having a movable part, a change speed transmission including shiftable gears for moving said part at a plurality of different speed ranges each including a plurality of different speeds, means for imparting working speed drive to said transmission, means for imparting a slow non-working speed drive to said transmission, means for selectively rendering said working speed drive and said slow non-working speed drive effective or ineffective, means for selectively shifting said gears to obtain different speed ranges and different speeds in said ranges, and means for controlling the previously named means and including means for causing automatically after the working speed drive has been rendered ineffective and the non-working speed drive rendered effective and prior to the shifting of the gears different time delays each of which is proportional to a different one of the different speed ranges.

6. In a machine tool having a movable part, a change speed transmission for moving said part at different operating speeds and including shiftable gears, a power drive for said transmission, means for rendering said drive effective or ineffective, means for selectively shifting said gears to obtain different operating speeds, and control means for said first means and said second means and including cycle control means actuated to initiate an automatic gear shifting cycle wherein said drive is rendered ineffective by said first means preparatory to the gear shifting by said second means, movable means for interposing automatically between such rendering of the power drive ineffective and the gear shifting different time delays each of which is proportional to a different one of the different operating speeds and after which said gears are shifted by said second means, and then automatically said cycle control means and movable time delay means are restored to their former positions.

7. In a machine tool having a movable part, a change speed transmission for moving said part at different speeds and including shiftable gears, certain of said gears acting to set up a plurality of different speed ranges for said transmission and part and other of said gears effecting variable speed operation thereof in each of said speed ranges, a power drive for said transmission, means for rendering said drive effective or ineffective, means for selectively shifting said gears to obtain a desired speed range and a desired speed of operation in said range, and a control means for all of said means and including a time delay means for interposing automatically different time delays between the rendering of the drive ineffective and the shifting of the gears and which time delays are each proportional to a different one of the different speed ranges.

8. In a machine tool having a movable part, a change speed transmission for moving said part at different speeds and including shiftable gears, certain of said gears acting to set up a plurality of different speed ranges for said transmission and part and other of said gears effecting variable speed operation thereof in each of said speed ranges, means for imparting working speed drive to said transmission, means for imparting a slow non-working speed drive to said transmission, means for selectively rendering said working speed drive and said slow non-working speed drive effective or ineffective, means for selectively shifting said gears to obtain a desired speed range and a desired speed of operation in said range for said transmission and part, and control means for all of said means and including time delay means for interposing automatically different time delays after said working speed drive has been rendered ineffective and said non-working speed drive rendered effective and prior to the shifting of said gears and each of which time delays is directly proportional to a different one of the different speed ranges.

9. In a machine tool having a movable part, a transmission for moving said part at different speeds and including shiftable gears, a pressure fluid motor for shifting said gears, a pressure fluid source, a pressure fluid circuit from said source to said motor and having therein a settable speed selector valve for controlling said motor and a time delay valve including a shiftable valve body having an area subject to fluid pressure to move the body in one direction and portions of different areas each smaller than said first area and proportional to a different speed of said part and selectively subject to fluid pressure to resist said movement, said circuit including means for conducting pressure fluid to said different areas, and means controlled by said motor for selecting the particular area of said different areas to which pressure fluid is to be applied to resist movement of said body in said one direction to provide the desired time delay.

10. In a machine tool having a movable part, a change speed transmission including shiftable gears for imparting a plurality of different speeds to said part, a power source, a main clutch for connecting said source and transmission for working speed operation of the latter, means for connecting said power source and transmission for slow non-working speed operation of the latter preparatory to gear shifting, a pressure fluid motor for actuating said means, a pressure fluid motor for shifting said gears, and control means for said motors and including a pressure fluid source, a shiftable cycle control valve, a speed selector valve, a pressure fluid circuit from said source to said cycle control valve and thence to said selector valve and thence to said gear shifting motor, said circuit also extending from said cycle control valve to said non-working speed means motor, a time delay valve in said circuit between said cycle control valve and said selector valve and normally interrupting said circuit and having a piston area which when subjected to pressure fluid moves the body of said time delay valve in one direction to establish said circuit, said time delay valve body having a plurality of smaller pistons each of different areas which when subject to pressure fluid resist movement of said body in said one direction to create a time delay, and a valve in said circuit and controlled by said gear shifting motor to selectively cause pressure fluid to be applied to one or another of said smaller pistons of the time delay valve body.

11. In a machine tool having a movable part, a change speed transmission for moving said part at different speeds and including shiftable gears, a power source, a clutch connecting said source and transmission for imparting to the latter a working speed, means for connecting said transmission to said power source for imparting to the latter a slow non-working speed preparatory to gear shifting, a pressure fluid motor for actuating said means, a pressure fluid motor operatively associated with said shiftable gears for shifting the same, a pressure fluid source, a cycle control valve connected to said pressure fluid source, a pressure fluid connection between said cycle control valve and said slow non-working speed means motor, a speed selector valve, a pressure fluid connection between said cycle control valve and said selector valve and having therein a time delay valve, a pressure fluid connection between said selector valve and said gear shifting motor, a second pressure fluid connection between said cycle control valve and said time delay valve, a valve operatively connected to said gear shifting motor and actuated by the latter, a direct pressure fluid connection between said last valve and said pressure fluid source, said time delay valve having a shiftable valve body provided with piston portions of different pressure areas, fluid pressure connections between said piston portions and said gear shifting motor actuated valve with one of said connections always effective for applying pressure fluid to one of said piston portions to maintain said time delay valve body normally in a position to interrupt the circuit between the cycle control valve and the selector valve, said time delay valve having a main piston portion connected to the cycle control valve by said second pressure fluid connection and subject to pressure fluid when said cycle control valve is shifted to initiate a gear shifting cycle, wherefore said time delay valve body will be moved from its normal position to establish communication between said cycle control valve and said selector valve with such movement opposed by the pressure fluid acting on one of said piston portions of different areas and which is related to one of the positions of the gear shifting motor.

12. In a machine tool as defined in claim 11 and wherein a pressure fluid motor is provided for actuating said clutch and there is a pressure fluid connection between said motor and said cycle control valve such that when said cycle control valve is shifted to initiate a gear shifting cycle said clutch is automatically disengaged to terminate the working speed drive of the transmission.

HARRY SCHOEPE.

REFERENCES CITED

The following references are of record in the file of this patent:

UNITED STATES PATENTS

| Number | Name | Date |
|---|---|---|
| 1,588,004 | Blood | June 8, 1926 |
| 1,979,488 | Perez | Nov. 6, 1934 |
| 2,058,586 | Heiss et al. | Oct. 27, 1936 |
| 2,110,173 | Pohl et al. | Mar. 8, 1938 |
| 2,164,884 | Nenninger et al. | July 4, 1939 |
| 2,167,790 | Whitehead et al. | Aug. 1, 1939 |